United States Patent
Rairick et al.

(10) Patent No.: US 8,417,582 B1
(45) Date of Patent: Apr. 9, 2013

(54) ON-LINE PRICE NEGOTIATION SYSTEM

(75) Inventors: David Matthew Rairick, Mars Hill, NC (US); Robert Anthony Deraco, Lancaster, PA (US)

(73) Assignee: Web Net, LLC, Lancaster, PA (US)

( * ) Notice: Subject to any disclaimer, the term of this patent is extended or adjusted under 35 U.S.C. 154(b) by 0 days.

(21) Appl. No.: 13/531,826

(22) Filed: Jun. 25, 2012

(51) Int. Cl.
*G06Q 30/00* (2012.01)

(52) U.S. Cl.
USPC ....... 705/26.3; 705/26.1; 705/26.5; 705/27.1; 705/37; 705/80; 705/5; 705/7

(58) Field of Classification Search .............. 705/26.1, 705/26.3, 37, 80, 26.5, 27.1, 5, 7
See application file for complete search history.

(56) References Cited

U.S. PATENT DOCUMENTS

| | | | |
|---|---|---|---|
| 5,794,207 A | 8/1998 | Walker et al. | |
| 7,363,246 B1* | 4/2008 | Van Horn et al. | 705/80 |
| 2006/0085208 A1* | 4/2006 | Nelson et al. | 705/1 |
| 2006/0212320 A1* | 9/2006 | Sauser et al. | 705/5 |
| 2008/0162211 A1* | 7/2008 | Addington | 705/7 |
| 2008/0294526 A1* | 11/2008 | Berkowitz et al. | 705/20 |
| 2009/0112733 A1* | 4/2009 | Horowitz | 705/27 |
| 2010/0004007 A1* | 1/2010 | Vogel et al. | 455/466 |
| 2012/0059702 A1 | 3/2012 | Yoder et al. | |
| 2012/0185353 A1* | 7/2012 | Goel | 705/26.5 |

* cited by examiner

*Primary Examiner* — Yogesh C Garg
(74) *Attorney, Agent, or Firm* — Jetter & Associates, P.A.

(57) ABSTRACT

An on-line price negotiation method includes submitting a bid from a buyer (buyer's bid) for a selected item/service offered for sale on a website via the internet to an on-line computing device that controls operations at the website. The computing device automatically responds to the buyer's bid, including creating an exclusive interaction for a maximum period of time between the buyer and website for the buyer to negotiate a price for the item/service, setting a minimum accept price for the item/service; and comparing the buyer's bid to the minimum accept price. Based on the comparing, the buyer is notified of accepting the buyer's bid (deal) or not accepting the buyer's bid (no-deal). A deal allows the buyer an option to purchase the item/service, or to update the buyer's bid and repeat submitting with an updated bid. no deal allows the buyer an option to update the buyer's bid and repeat submitting an updated bid.

12 Claims, 4 Drawing Sheets

ON-LINE PRICE NEGOTIATION SYSTEM

FIELD

Disclosed embodiments relate to automated on-line price negotiation/barter systems.

BACKGROUND

Bidding and price negotiating e-commerce systems are well known. The Priceline.com system disclosed in U.S. Pat. No. 5,794,207 entitled "Method and Apparatus for a Cryptographically Assisted commercial Network System Designed to Facilitate Buyer-driven Conditional Purchase Offers" to Walker et al. is an on-line bidding process in which a buyer specifies the price he or she desires to pay for an item, such as an airplane reservation or an automobile. The buyer's bid is submitted over the Internet to a central site which analyzes a database of sellers for that type of item to find one or more sellers currently selling the item at close to the bid price. The bidding process is always open to other buyers. Matches or near-matches are presented to the buyers after a time period that is generally associated with identifying a seller, where the buyer can then select from the seller and place a conditional purchase offer price. If the seller accepts the buyer's offer price, the sale is made. If the seller accepts the buyer's offer price, the buyer does not have the ability to offer a lower price, and is contractually obligated to purchase the item.

The Priceline' system like other known on-line bidding and price negotiating systems involve a plurality of buyers and a typically also a plurality of sellers at any given time for each item or service, and thus lacks privacy and exclusivity between the buyer and the seller. Such known on-line bidding and price negotiating systems also are generally not real-time, nor are they interactive.

SUMMARY

Disclosed embodiments include on-line price negotiation methods. A buyer's (or shopper's) bid is submitted for a selected item or service offered for sale on a website via a communications path including the Internet to an on-line computing device that controls operations at the website. The computing device automatically responds to the buyer's bid by (i) creating an exclusive interaction for a maximum period of time (e.g., 10 minutes) between the buyer and the website for the buyer to negotiate a price for the item/service, and (ii) sets a minimum accept price ($P_A$) for the item/service. As used herein an "exclusive interaction" refers to a period of time (e.g., 10 minutes) where only the buyer (and not any other potential buyers) is permitted to bid for the selected item/service, where the period of time for the exclusive interaction is defined by an earlier of the maximum period and an earlier termination event, such as a buyer's checkout or abandoning the website's webpage.

The computing device also (iii) compares the buyer's bid to $P_A$, and (iv) based on the comparing, notifies the buyer of accepting the buyer's bid (a "deal") or not accepting the buyer's bid ("no-deal"). A deal allows the buyer an option to purchase the item/service, or to update the buyer's bid and repeat submitting with an updated bid, and no deal allows the buyer the option to update the buyer's bid and repeat the submitting with the updated bid.

Disclosed embodiments also include systems for on-line negotiated item/service transactions. Such systems include a computing device having a processor connected to a memory comprising a non-transitory machine readable storage device that controls operations at the website; where the memory stores a disclosed automatic on-line price negotiation program. The computing device is programmed to implement the automatic on-line price negotiation program.

Features disclosed herein that are believed to be unique include buyers negotiating the price for an item/service privately/exclusively. Buyers thus do not compete against other buyers for the item(s)/service(s) they select to bid on. Buyers also have the ability to place an unlimited number of bids during the maximum period of time set by the website to allow the buyer to lower the buyer's bid for the selected item/service. Another new aspect is that buyers are not obligated to purchase the item/service they have negotiated a deal for.

BRIEF DESCRIPTION OF THE DRAWINGS

Reference will now be made to the accompanying drawings, which are not necessarily drawn to scale, wherein.

DETAILED DESCRIPTION

Figure 1:
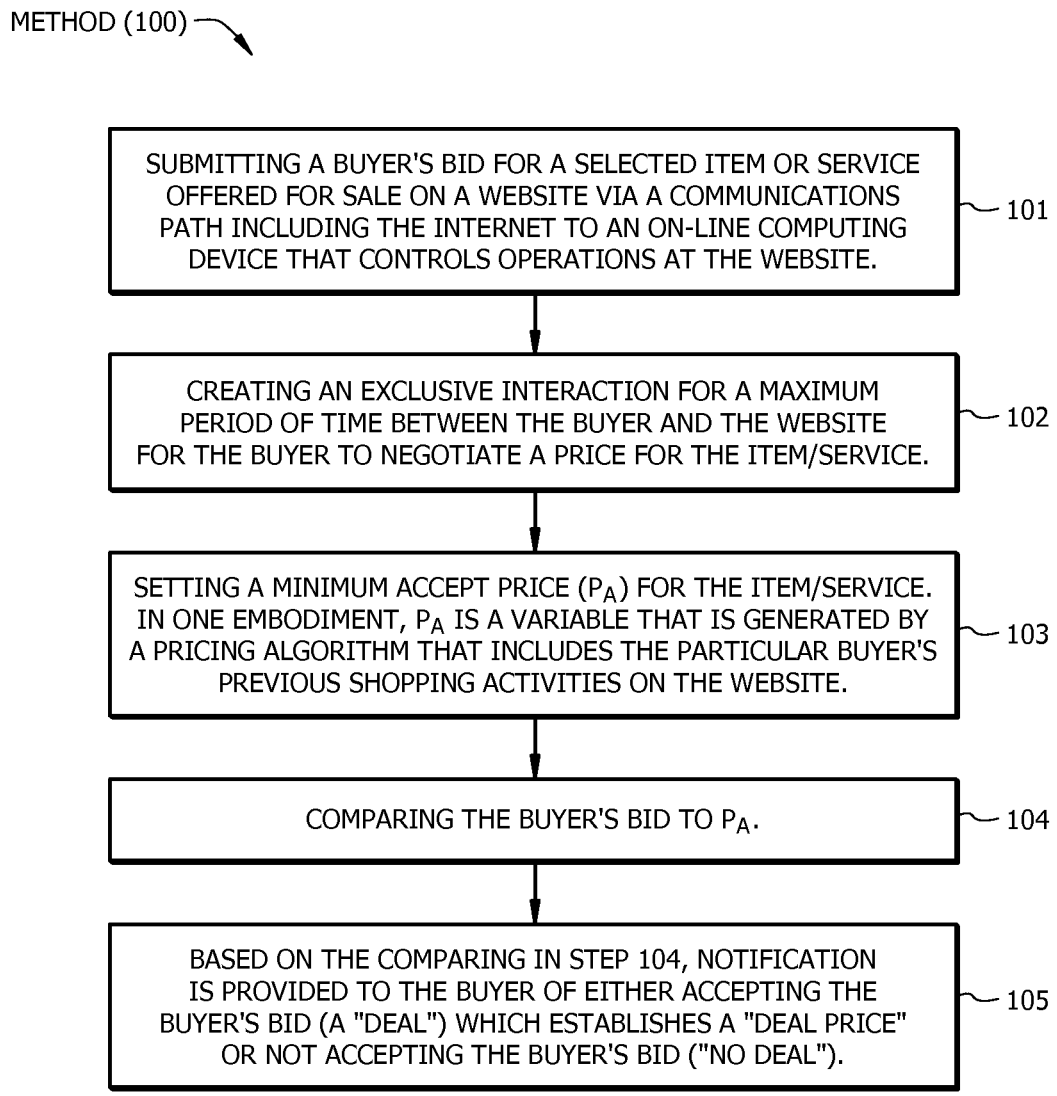
FIG. 1 is a flow chart that shows steps in an example method for on-line price negotiation, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

FIG. 1 is a flow chart that shows steps in an example method 100 for on-line price negotiation according to an example embodiment. Disclosed methods provide an interactive, real-time, exclusive, timed, on-line price negotiation session, between the website and a buyer.

Step 101 comprises submitting a buyer's bid for a selected item/service offered for sale on a website via a communications path including the Internet to an on-line computing device that controls operations at the website. Buyers can log into the website running a disclosed on-line price negotiation system and identify a specific item/service that they desire to negotiate a price on.

Steps 102-105 involve the computing device automatically responding to the buyer's bid. Step 102 comprises creating an exclusive interaction for a maximum period of time between the buyer and the website for the buyer to negotiate a price for the item/service. In one specific example, the maximum period of time is 10 minutes, while in another embodiment the maximum period of time is 60 minutes. During this maximum period of time the buyer can utilize as many bids/offers for the selected item(s) as they want to negotiate the price as low as they desire.

Step 103 comprises setting a minimum accept price ($P_A$) for the item or service. In one embodiment, described below, $P_A$ is a variable that is generated by a pricing algorithm that includes the particular buyer's previous shopping activities on the website. Moreover, as described below, the pricing algorithm can include a random number generation aspect.

Step 104 comprises comparing the buyer's bid to $P_A$. In step 105, based on the comparing in step 104, notification is provided to the buyer of either accepting the buyer's bid (a "deal") which establishes a "Deal Price" or not accepting the buyer's bid ('no-deal"). A deal allows the buyer the option to purchase the item/service, or to update the buyer's bid and repeat the submitting with an updated bid. No deal allows the buyer the option to update the buyer's bid and repeat the submitting with the updated bid, or to buy the item/service using a previously submitted buyer's bid price for the item/service that resulted in a deal at a "deal price". the "deal price" option will generally only be available for a predetermined period of time, such as for 24 hours.

If the buyer's bid is agreed upon by the website, the buyer will have the remaining time in the maximum period of time to optionally checkout. At checkout, payment can be executed on a credit card or an on-line payment system such as PAY-PAL.

Features believed to be unique disclosed herein include buyers negotiating privately and exclusively. Buyers thus do not compete against other buyers for the selected item/service they bid on. Buyers also have the ability to place an unlimited number of bids during the full duration of the maximum period of time to lower the bid price on the selected item/service. As described above, another unique aspect is that buyers are not obligated to purchase the item/service, even after the buyer's bid price for the item/service resulted in a deal.

FIGS. 2A-2E show an example sequence of steps for a disclosed method for on-line price negotiation, according to an example embodiment. For this example, it is assumed the website's $P_A$ for a tablet computer (e.g. such as the IPAD™ from Apple Computer, Inc.) which provides a platform for audio-visual media including books, periodicals, movies, music, games, apps and web content is $550.00, and the tablet computer has a retail price of $799.00.

Figure 2A:
FIGS. 2A-2E show an example sequence of steps for a disclosed method for on-line price negotiation, according to an example embodiment.
Figure 2B:
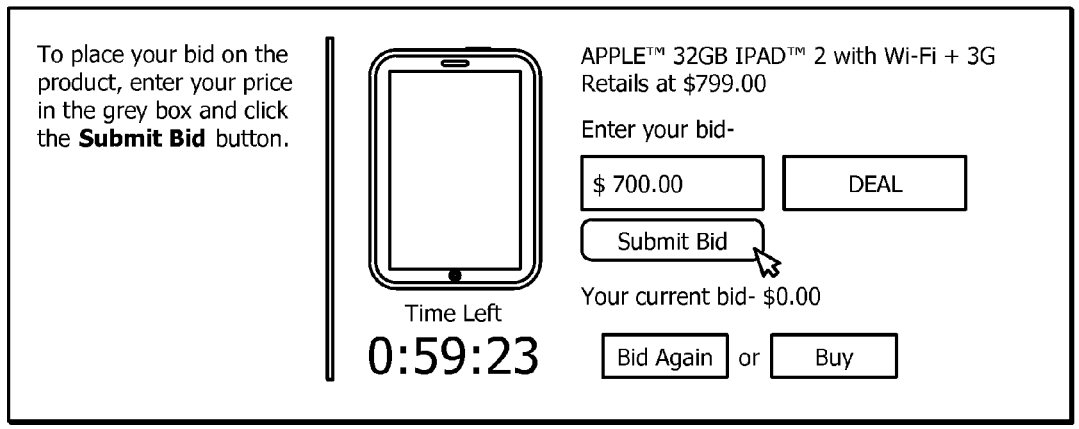

As shown in FIG. 2A the website informs the buyer the tablet computer retails for $799.00, and the buyer has 1 hour (the example duration of the maximum period of time for the session set by the website for the exclusive interaction between the buyer and website for the buyer to negotiate a price for the item/service) to bid on the tablet computer. The "Time Left" shown in FIGS. 2A-2E is equal to 1 hour (60 minutes) which corresponds to full duration of the maximum period of time for the session. As shown in FIG. 2B, the buyer is prompted to place their bid on the tablet computer to "enter your price in the gray box and click the Submit Bid button", shown in FIG. 2B after entry of a $700 bid by the buyer. Prior to entry of the buyer's (first) bid for the current session, the buyer's current bid is 0.

Figure 2C:

As shown in FIG. 2C, after the buyer submits the $700.00 bid, the website notifies the buyer whether the current bid is a deal or no deal. The screen shown in FIG. 2C notifies to the buyer "If you have a Deal on your bid, you then have the option to bid again or buy the product by clicking on one of the buttons below". Since the buyer's bid of $700.00 entered is above the website's current $P_A$ of $550.00, the comparing by the computing device at the website of the buyer's bid to the $P_A$ results in the website notifying the buyer of accepting the buyer's bid (resulting in a deal) with a time left shown as 58:36. The buyer in this example does not elect to checkout despite the Deal made, and continues bidding using lower bids as described below.

Figure 2D:

FIG. 2D shows the case of No-Deal on the buyer's 4th bid when the time left is 24:17 (there are, not show, intervening bids numbers 2 and 3, with one of these bids resulting in a deal at a bid price of $625 that did not proceed to checkout). Since the buyer's current bid of $525.00 entered is below the website's current $P_A$ of $550.00, the comparing performed by the computing device at the website of the buyer's bid to the $P_A$ results in notifying the buyer of no-deal. The website is shown notifying the buyer "If you are notified that you have No Deal on your bid, you then have the option to bid again or buy the product at your last bidding price that was a Deal", here $625.

Figure 2E:

FIG. 2E, another bid of $565.00 is shown placed by the buyer when the time left is 14:32, resulting in a deal since the buyer's current bid of $565.00 entered is above the website's current $P_A$ of $550.00. The website is also shown notifying the buyer "After you have reached the Deal you desire, you buy the product by clicking on the Buy button below. You can keep bidding to reach an even better Deal if you so desire, as long as it is within the 1-hour". As disclosed above, the buyer has the option to proceed or not to proceed to checkout despite the deal being made, and can continue bidding using lower bids for the remaining 14:32.

Assume the buyer does not place any more bids during the current session and the time remaining expires so that the buyer completed his or her bid process without checkout at the expiration time with a deal price of $565. The "Deal Price" of $565 will be available for a predetermined period of time, such as for 24 hours. If the tablet computer is not purchased by the buyer within that 24-hour timeframe, the "Deal" is withdrawn and the buyer will have to bid again to purchase the tablet computer.

Disclosed embodiments also include the option of providing a flexible (time variable) $P_A$ by including a flexible accept price determination algorithm run by the website's computing device, that can also include consideration of each buyer's particular purchase history. The price determination algorithm automatically generates a markup (M) that determines the $P_A$ of an item or service as a function of the buyer's past history on the website or in one embodiment on its affiliate sites as well, even if the buyer's activity on the website did not result in a completed purchase.

An example flexible accept price ($P_A$) determination algorithm is described below. $P_A$ is calculated first. When the buyer submits an offer to the website that is above or equal to $P_A$, they may purchase the item/service or submit a new offer. When the buyer submits an offer below $P_A$, the buyer may not purchase the item/service, but instead may submit another offer. $P_A$ can be calculated by multiplying the Cost (C) by a Mark-up (M), such as shown in the equation below.

$$P_A = M * C$$

C generally includes the cost of the goods or services, administrative, and shipping costs (for goods) combined from a supplier. M varies based upon the purchase rank (R) for the particular buyer which reflects the number of the buyer's past purchases completed in the past on the website, either for a most recent predetermined period of time (e.g., 1 year), or during any time. For example:

R≦2, then M=1.1 to 1.2
R>2 but ≦5, then M=1.14 to 1.34
R≧6 but ≦8, then M=1.1 to 1.34
R>8, then M=1.2 to 1.5

The actual value of M used within the defined ranges based on R can be determined by a random value generator that select a random M value within a markup range based upon a time-stamp that reflects of the moment (e.g., microsecond) in time when the bidding webpage is accessed by the buyer, thus defined at the moment in time when the first read/write function is sent to the database that houses the buyer's profile and bidding history information. $P_A$ thus can fluctuate based on the buyer's past purchase activity on the website through changes in M.

Purchase attempts do not affect R. An attempt can be defined as the interaction of a buyer through the offer process without consummating the purchase. There may only be one attempt logged per interaction with a single item/service.

An attempt turns into a purchase when the buyer adds the item/service for which they are bidding to their shopping cart. The purchase is then consummated through a payment processing gateway as described above.

An abandoned purchase scenario can be included with the $P_A$ determination algorithm that functions to modify M and thus $P_A$. As described above, M can be determined based on R. However, if the buyer logs a predetermined number of attempts (e.g., four attempts) without making a purchase, M can be modified as follows:

If the number of Attempts≧predetermined number of Attempts (e.g., 4) without the buyer consummating the purchase, M can automatically revert to a value in a lower predetermined M range (e.g., 1.1 to 1.2) until a predetermined number of new purchases (e.g., 3) are completed. After the predetermined number of new purchases is completed, M can revert to a value in a higher predetermined M range (e.g., 1.2 to 1.5).

Figure 3:
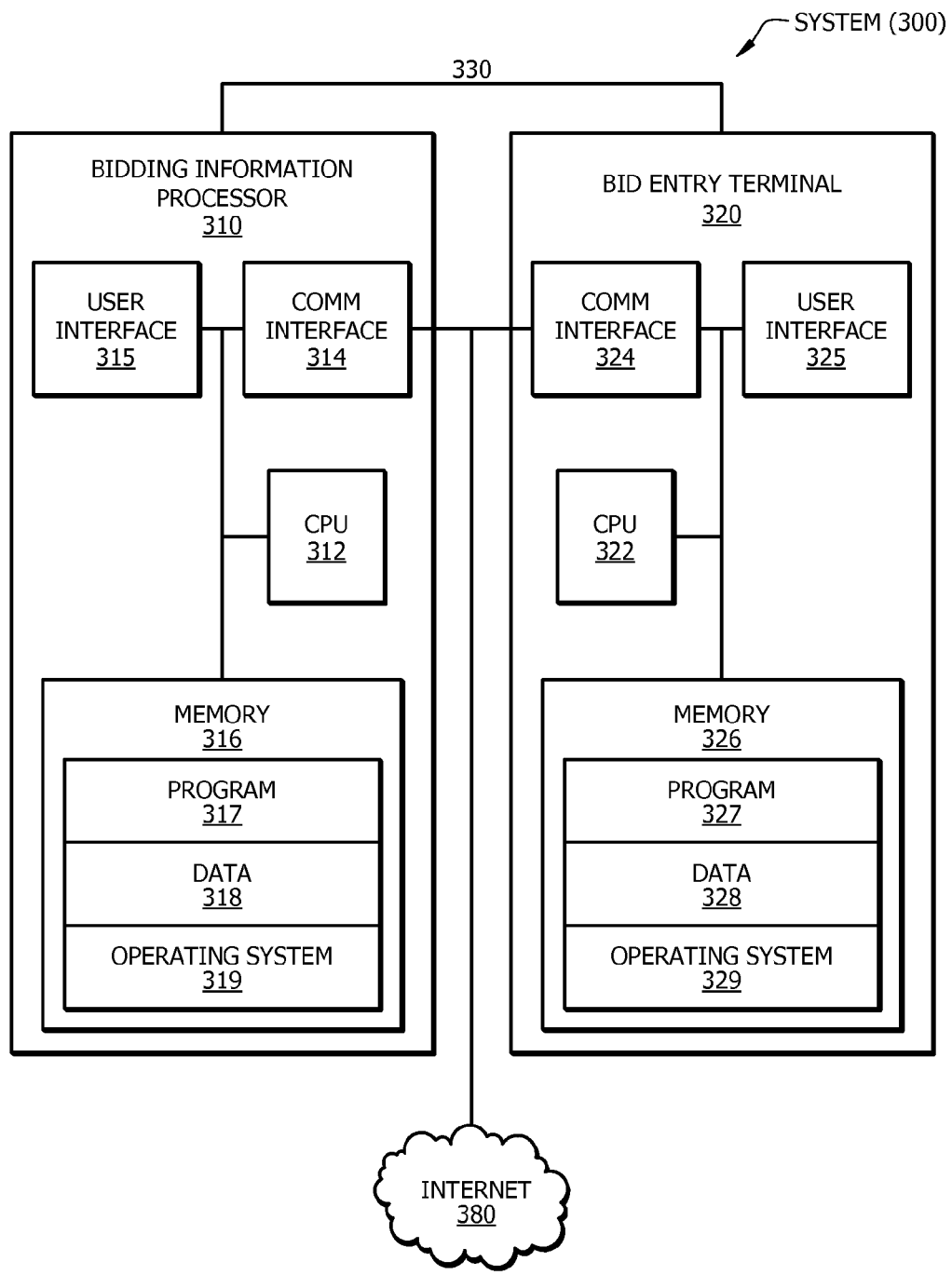
FIG. 3 is an example system for on-line negotiated item/service transactions, according to an example embodiment.

FIG. 3 is an example system 300 for on-line negotiated item or services transactions, according to an example embodiment. System 300 includes Bidding Information Processor (BIP) 310 and at least one Bid Entry Terminals (BET) BET 320. BET 320 is communicatively coupled to BIP 310 over a communication system 330 that can comprise a variety of connections, such as an intranet connection. Communication system 330 is connected to the Internet 380 to allow communication with on-line shoppers/buyers. BET 320 includes a computing device 322 shown as central processing unit (CPU) including a processor which executes program instructions which carry out the sequence of steps for disclosed embodiments including a disclosed automatic on-line price negotiation program.

BET 320 includes communication interface 324, which transmits and receives signals over communication system 330 under control of CPU 322. These signals represent messages generated by CPU 322 and messages destined for CPU 322. BET 320 includes a non-transitory memory 326, which stores program instructions and data used by CPU 322. Memory 326 is shown including a program partition 327, which stores the program instructions executed by CPU 322 in performing certain disclosed functions, data partition 328, which stores data used by CPU 322 in conjunction with the program instructions in program partition 327, and operating system 329.

Memory 326 can comprise random access memory (RAM) devices and may include other non-transitory (tangible) machine readable storage devices such as, for example, hard disk storage devices, floppy disk storage devices, tape storage devices, optical disk storage devices and read-only memory (ROM) devices. BET 320 also includes user interface 325, which allows a buyer/bidder to enter and receive bidding information. User interface 325 typically includes, for example, a display and a keyboard, and may include a device such as a mouse.

BIP 310 includes a computing device 312 shown as CPU 312 that generally includes a processor which executes program instructions which carry out the sequence of steps for disclosed embodiments. BIP 310 includes communication interface 314, which transmits and receives signals over communication system 330 under control of CPU 312. These signals represent messages generated by CPU 312 and messages destined for CPU 312. BIP 310 includes memory 316, which stores program instructions and data used by CPU 312. Memory 316 is shown including program partition 317, which stores the program instructions executed by CPU 312 in performing disclosed functions, data partition 318, which stores data used by CPU 312 in conjunction with the program instructions in program partition 317, and operating system 319. Memory 316 can comprise RAM devices and may include other storage devices such as, for example, hard disk storage devices, floppy disk storage devices, tape storage devices, optical disk storage devices and ROM devices. BIP 310 may also include user interface 315, which allows a system operator to observe and control operations. Interface 315 typically includes, for example, a display and a keyboard, and may include a device such as a mouse.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

We claim:

1. An on-line price negotiation method, comprising:
submitting a bid from an individual buyer (buyer's bid) for a selected item or service offered for sale on a website via a communications path including the Internet to an on-line computing device that controls operations at said website;
said computing device automatically responding to said buyer's bid, including:
creating an exclusive interaction for a maximum period of time between said individual buyer and said website for said individual buyer to negotiate a price with said website for said item/service;
setting a minimum accept price ($P_A$) for said item/service which is fixed during said exclusive interaction with said individual buyer for said selected item or services; wherein said $P_A$ generated by a pricing algorithm that includes previous shopping activities of only said individual buyer on said website;
comparing said buyer's bid to said $P_A$;
based only on said comparing, notifying said individual buyer of accepting said buyer's bid (deal) if said buyer's bid is at least said $P_A$ or not accepting said buyer's bid (no-deal) if said buyer's bid is less than said $P_A$,
wherein said deal allows said individual buyer an option to purchase said item/service, or to update said buyer's bid and repeat said submitting with said updated bid, and
wherein said no-deal allows said individual buyer an option to update said buyer's bid and repeat said submitting with said updated bid.

2. The method of claim 1, wherein said computing device automatically provides information that displays a timer on a screen used by said individual buyer that provides an updatable remaining time for said exclusive interaction.

3. The method of claim 1, wherein if said deal results, and wherein said individual buyer does not checkout within a maximum session duration, said deal is forfeited.

4. The method of claim 1, wherein said previous shopping activities include a number of purchases completed on said website by said individual buyer.

5. The method of claim 1, wherein said pricing algorithm utilizes a random value to determine a value of a markup to calculate said $P_A$.

6. The method of claim 5, wherein said markup reflects attempts by said individual buyer on said website that do not consummate in purchases.

7. A system for on-line negotiated item transactions, comprising:

a computing device including a processor connected to a memory comprising a non-transitory machine readable storage device that controls operations at an on-line website; wherein said memory stores an automatic on-line price negotiation program and said computing device is programmed to implement said automatic on-line price negotiation program, wherein said computing device automatically:

receives a bid from an individual buyer (buyer's bid) for a selected item or service offered for sale on said website via a communications path including the internet; and automatically responds to said buyer's bid, including:

creating an exclusive interaction for a maximum period of time between said individual buyer and said website for said individual buyer to negotiate a price with said website for said item/service;

setting a minimum accept price ($P_A$) for said item/service which is fixed during said exclusive interaction with said individual buyer for said selected item or services; wherein said $P_A$ generated by a pricing algorithm that includes previous shopping activities of only said individual buyer on said website;

comparing said buyer's bid to said $P_A$;

based only on said comparing, notifying said individual buyer of accepting said buyer's bid (deal) if said buyer's bid is at least said $P_A$ or not accepting said buyer's bid (no-deal) if said buyer's bid is less than said $P_A$, wherein said deal allows said individual buyer an option to purchase said item, or to update said buyer's bid and repeat said submitting with said updated bid, and wherein said no-deal allows said individual buyer an option to update said buyer's bid and repeat said submitting with said updated bid.

8. The system of claim 7, wherein said computing device automatically provides information that displays a timer on a screen used by said individual buyer that provides an updatable remaining time for said exclusive interaction.

9. The system of claim 7, wherein if said deal results, and wherein said individual buyer does not checkout within a maximum session duration, said computing device forfeits said deal.

10. The system of claim 7, wherein said previous shopping activities include a number of purchases completed on said website by said individual buyer.

11. The system of claim 7, wherein said pricing algorithm utilizes a random value to determine a value of a markup to calculate said $P_A$.

12. The system of claim 11, wherein said markup reflects attempts by said individual buyer on said website that do not consummate in purchases.

* * * * *